United States Patent
Deckman et al.

(10) Patent No.: US 6,830,596 B1
(45) Date of Patent: Dec. 14, 2004

(54) ELECTRIC POWER GENERATION WITH HEAT EXCHANGED MEMBRANE REACTOR (LAW 917)

(75) Inventors: Harry W. Deckman, Clinton, NJ (US); John W. Fulton, Randolph, NJ (US); Jeffrey M. Grenda, Clinton, NJ (US); Frank Hershkowitz, Liberty Corner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 780 days.

(21) Appl. No.: 09/606,887

(22) Filed: Jun. 29, 2000

(51) Int. Cl.$^7$ ................................................. C10J 3/00
(52) U.S. Cl. ................ 48/95; 48/61; 48/94; 48/127.9; 48/128; 422/189; 422/190; 422/191; 422/193; 422/194; 422/202; 422/203; 422/204; 422/211; 422/236; 60/39.12; 60/780
(58) Field of Search ............................... 48/127.9, 128, 48/198.2, 215, 214 A, 214 R, 198.3, 61, 198.7, 94, 198.8, 95; 422/187–191, 193, 194, 198, 211, 202–204, 236, 238; 60/39.01, 780, 39.12, 722, 39.462

(56) References Cited

U.S. PATENT DOCUMENTS

| | | | |
|---|---|---|---|
| 5,048,284 A | * | 9/1991 | Lywood et al. ................ 60/780 |
| 5,133,180 A | * | 7/1992 | Horner et al. .............. 60/39.12 |
| 5,729,967 A | * | 3/1998 | Joos et al. ................... 60/39.6 |
| 5,741,474 A | * | 4/1998 | Isomura et al. .......... 423/648.1 |

\* cited by examiner

*Primary Examiner*—Jerry D. Johnson
*Assistant Examiner*—Basia Ridley
(74) *Attorney, Agent, or Firm*—Paul E. Purwin

(57) ABSTRACT

This invention is directed to a heat exchanged membrane reactor for electric power generation. More specifically, the invention comprises a membrane reactor system that employs catalytic or thermal steam reforming and a water gas shift reaction on one side of the membrane, and hydrogen combustion on the other side of the membrane. Heat of combustion is exchanged through the membrane to heat the hydrocarbon fuel and provide heat for the reforming reaction. In one embodiment, the hydrogen is combusted with compressed air to power a turbine to produce electricity. A carbon dioxide product stream is produced in inherently separated form and at pressure to facilitate injection of the $CO_2$ into a well for the purpose of sequestering carbon from the earth's atmosphere.

21 Claims, 2 Drawing Sheets

ELECTRIC POWER GENERATION WITH HEAT EXCHANGED MEMBRANE REACTOR (LAW 917)

FIELD OF THE INVENTION

I. Background of the Invention

This invention relates to heat exchanged hydrogen membrane reactors. More particularly, the invention relates to a hydrogen membrane reactor that employs catalytic or stream reforming and a water gas shift reaction on one side of the membrane, and hydrogen combustion on the other side of the membrane. A portion of the heat of the highly exothermic hydrogen combustion is exchanged through the membrane to supply heat to the reforming reaction. The hydrogen combustion product is used to power a turbine for producing electricity.

II. Description of the Related Art

Steam reforming to produce elemental hydrogen is generally known in the art. An idealized steam reforming reaction for a methane feed is represented by the equation:

$$CH_4 + H_2O \rightarrow 3H_2 + CO$$

The above-described reforming reaction is highly endothermic, having a heat of reaction of approximately 88,630 BTU/Mole. Reforming reactions of other hydrocarbon feeds are similarly endothermic. Water Gas Shift reactions to produce hydrogen from carbon are also generally known in the art. An idealized water gas shift reaction for a CO feed is represented by the equation:

$$CO + H_2O \rightarrow H_2 + CO_2$$

This is a mildly exothermic reaction, having a heat of reaction of approximately −17,698 BTU/Mole.

Hydrogen permeable membranes are also generally known in the art, and have been utilized in hydrogen separation in varied applications. The present invention however, utilizes a hydrogen membrane in a novel reactor configuration that is particularly adapted to combust the hydrogen and use its heat of combustion in the hydrogen producing reaction while using the energy of combustion to power or turbine.

SUMMARY OF THE INVENTION

The present invention is directed to a heat exchanged membrane reactor that (A) separates hydrogen from a hydrocarbon source using a membrane, (B) combusts the hydrogen, (C) transmits a portion of the heat of the combusted hydrogen to an endothermic reformer process, (D) uses the product of the hydrogen combustion to power a turbine for power generation. The heat exchanged membrane reactor employs thermal or catalytic steam reforming of a hydrocarbon feed to produce hydrogen, which permeates the reactor membrane to the opposite side, where it is combusted. A portion of the heat of combustion is transmitted through the membrane to supply heat to the reforming reaction, a highly endothermic reaction. The combustion product is used to power a turbine for generating electricity. In a further embodiment, a water gas shift reaction is employed on the reformer side of the membrane reactor to convert CO to $CO_2$ that may be conveniently sequestered. The heat-exchanged membrane need withstand elevated temperatures, ranging from about 400° C. to about 1400° C., and have hydrogen permeance of at least a portion of the membrane ranging from about 1 Mole/($Meter^2$-Day-Atmosphere of $H_2$) to about $10^6$ Moles/($Meter^2$-day-atmosphere of $H_2$). In a preferred embodiment, the reforming reaction and at least a portion of the hydrogen combustion occurs proximate to the membrane to facilitate the heat transfer.

DETAILED DESCRIPTION OF THE INVENTION

Figure 1:
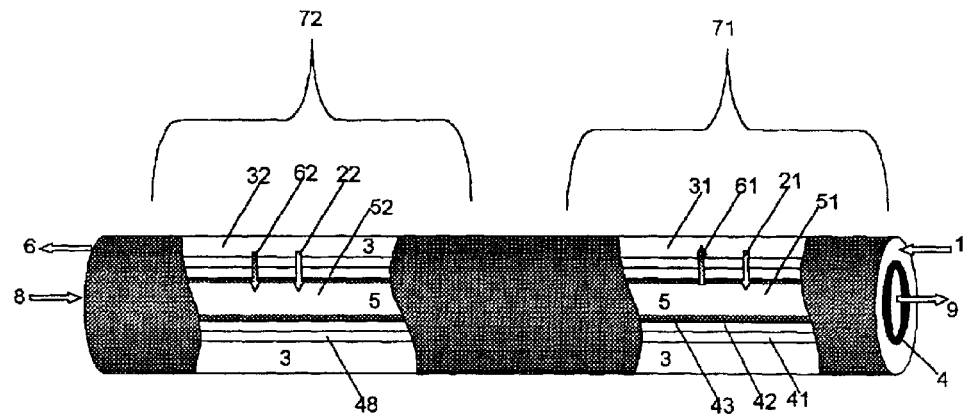
FIG. 1 is across sectional view of an embodiment of the heat exchange membrane reactor.

The operation of the heat exchange membrane reactor of the invention may be better understood by reference to the diagram of FIG. 1. In FIG. 1, a reforming feed 1 containing hydrocarbon and water and/or steam is supplied to a "reformer side" 3 of the membrane reactor. A reformer effluent 6 is withdrawn or exits from that side. Compressed air 8 is fed to the combustion side 5 of the membrane, and combustion effluent 9 is withdrawn or exits from that side. In FIG. 1, the membrane 4 is in the form of a tube and the reforming side 3 is on the outside of the tube, while the combustion side 5 is on the inside of the tube.

Conventional steam reforming reactions are utilized on the reforming side 3 to react the hydrocarbon with $H_2O$ to form elemental hydrogen and at least CO. The water and/or steam and hydrocarbon fuel are supplied at pressures ranging from about 1 bar to about 300 bars, and preferably from about 5 bars to about 40 bars to both facilitate hydrogen permeance through the membrane and help maintain structural integrity of the membrane 4. The hydrocarbon feed may comprise any carbon-containing fuel susceptible to thermal or catalytic reforming and/or shift reaction known in the art to produce hydrogen such as carbon monoxide, methane and propane.

For hydrocarbon feeds (i.e., those molecules containing only C and H) there need be at least two moles of water in the feed per moles of carbon feed. Less water causes incomplete conversion and carbon deposition, therefore, it may be desirable to use water feed content ranging from about 1.7 to about 6.0 moles of water per mole of hydrocarbon feed. More preferably, water feed content ranges from about 2 to about 4 moles of water per mole of hydrocarbon feed. For general carbon containing feeds, the steam amount is expressed as a steam to carbon ratio (S/C), which is preferred to be in the range of 1 to 6. More preferably, for carbon containing feeds with overall molar composition expressed as $C_xH_yO_z$, the steam to carbon ratio is between (2-z/x) and (3-z/x).

Steam reforming is a highly endothermic reaction. For example, reforming a simple methane hydrocarbon feed $$CH_4 + H_2O \rightarrow 3H_2 + CO$$

has a heat of reaction of about 88,630 BTU/mole. One aspect of the present invention is the utilization of at least a portion of the heat of hydrogen combustion to supply at least a portion of the heat requirements of the reformer's endothermic reaction. To facilitate this, the reforming reaction preferably occurs proximate to or most preferably, at the reformer side surface of the membrane. A means to accomplish this is to promote the reforming reaction using a catalyst that is contiguous with, or deposited on at least a portion of the membrane 4. In one embodiment, a reforming catalyst is deposited onto or into a portion of the surface of the membrane. FIG. 1 shows a catalyst (41, 48) deposited onto the surface of the membrane. Examples of materials that are suitable as reforming catalysts include nobel metals and nobel metal oxides such as Platinum, Ruthenium, and oxides thereof, transition metals and transition metal oxides and generally elements or oxides of group VIII metals as well as Ag, Ce, Cu, La, Mo, Mg, Sn, Ti, Y and Zn, or combinations thereof. Preferred catalyst systems include Ni, NiO, Rh, Pt and combinations thereof These materials may be deposited or coated on the membrane surface or incorporated into the catalyst surface by means known in the art.

As stated above, the feed fuel and water and/or steam feed are at pressures ranging from about one (1) to about three hundred (300) bars, and preferably between about five (5) and forty (40) bars. The operating temperature of the membrane will range from about 400° C. to about 1400° C. with a preferred operating temperature range of about 700° C. to about 1300° C. While the adiabatic upper temperature limit is about 2000° C., present membrane and gas turbine technology have an operating limit of about 1400° C. The operating temperature on the reforming side of the membrane may be up to about 200° C. cooler than the temperature on the combusting side. A sufficient level of hydrogen permeance through the membrane is required in the practice of the invention. Hydrogen permeance under operating conditions will range from about one (1) to about one million ($10^6$) moles ($m^2$-day-atm $H_2$). The permeance referred to is a point permeance that can be defined at each point on the membrane surface and the units atmosphere of $H_2$ refer to the difference between the hydrogen partial pressure across the membrane. One skilled in the art will recognize that hydrogen permeance will be influenced by the hydrogen-pressure differential between the reformer side 3 of the membrane and the combustion side 5 of the membrane, the temperature of the membrane 4 and/or hydrogen gas, and strongly influenced by the composition, thickness and configuration or shape of the membrane and membrane surface(s). Because of the wide variation in physical conditions along the length of the membrane, we require that at least one region of or on the membrane has a hydrogen permeance in the range from 1 Mole/{Meter$^2$-Day-Atmosphere of $H_2$) to $10^6$ Mole/{Meter$^2$-Day-Atmosphere of $H_2$). Suitable membrane materials are ceramics such as alumina and zirconia silicon carbide, silicon nitride, or combinations thereof, including for example, $Al_2O_3$, $ZrO_2$, MgO, $TiO_2$, $La_2O_3$, $SiO_2$, perovskites, hexaaluminates, and metals such as nickel and high nickel content alloys, and cermets.

Membranes may be incorporated into a module. Several technologies exist to form membrane combustor modules. Membrane modules provide means to combine multiple membrane elements with a gas distribution means and with flow passages or channels that bring the gases into close proximity to the membrane. Membrane elements may be fabricated in many ways, including as tubes and flat plates. Module technologies suitable for various membrane elements are known in the art.

Within the module, the membrane may be in the form of a flat sheet, tube, hollow fiber, or may be integrated into a monolithic structure. The membrane is sealed to or into the module so that the feed and permeate are separated from each other by the membrane. In a preferred embodiment the membrane is sealed into the module so that the feed and permeate streams are separated. In this embodiment the module provides a method of distributing and collecting separate feed and permeate streams from individual membrane elements. The membrane elements may be formed as a symmetric or asymmetric structure. The membrane may also have a catalytic functionality incorporated into it. Catalyst functionality may be provided as pelletized or powder catalyst, supported or unsupported, that is loaded into the gas passageways proximate to the membrane, or catalyst, supported or unsupported, may be applied directly to the membrane surfaces, or as a porous layer integral with the membrane. Catalyst functionality may be provided in multiple ways and on either or both sides of the membrane.

In a preferred embodiment, heat exchange membrane 4 comprises an asymmetric membrane having a relatively porous support or substrate and a thin separation layer that selectively diffuses hydrogen. The porous support, illustrated in FIG. 1 as 42, provides mechanical strength and structural integrity as well as facile transport of molecules to the separation layer 43. The porous support may be composed of multiple layers of material, each with a differing chemical composition or pore size. In a preferred embodiment, the majority of pores in the support are in the range from 0.05 to 30 μm. Materials that can be used for supports include alumina, zirconia, silicon carbide, and porous metals such as porous steel, nickel and alloys such as Hasteloy. The support structure is preferably stable under high temperature operating conditions and must not be degraded by molecular species that are utilized or formed in the process (for example steam). The membrane 4 illustrated in FIG. 1 is comprised of catalyst (41,48), porous support 42, and permselective layers 43. Catalysts 41 and 48 may comprise two or more catalysts, one serving to catalyze the steam reforming reaction, the second to catalyze the water gas shift reaction.

A thin selective diffusion layer, illustrated in FIG. 1 as 43, may be positioned on or into the combustion side surface of the membrane. This is most preferable when, for example, hydrocarbon feeds contain materials that would be deleterious to such material. The thin selective diffusion layer may comprise a thin film of metal such as nickel, or ferrous alloys or inorganic materials such as alumina, zirconia, yttrium stabilized zirconia, silicon carbide, silicon nitride, perovskites and hexaaluminates ranging in thickness from about 100 angstroms to 500 microns. The asymmetric configuration facilitates high hydrogen permeance while maintaining hydrogen selectively and structured integrity under the contemplated operating temperatures and pressures.

In a preferred embodiment, the steam reforming reaction is followed by a water shift gas reaction on the reformer side 3 of the membrane reactor. This reaction, generally known to those skilled in the art, converts carbon monoxide into a carbon dioxide. An idealized reaction is represented by the formula:

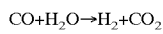

The reaction is mildly exothermic having a heat of reaction of approximately −17,700 BTU/mole. As practiced in the art, water gas shift is accomplished in two stages, at high and low temperature, respectively. In the first (high temperature) stage, the reaction is conducted with chromium promoted iron catalyst at an inlet temperature of about 370° C. Reaction exothermically raises the temperature to about 430° C. at the exit. A second stage of low temperature shift is then employed because equilibrium toward hydrogen is improved at lower temperature.

In a preferred embodiment of the present invention, permeation of hydrogen through the membrane is used to drive the equilibrium, instead of using lower temperature. This permits deleting the low temperature shift portion, and permits the user to run the high temperature shift at higher temperatures. In one embodiment, the catalyst used for steam reforming is also used to catalyze the shift reaction, and shift and reforming reactions occur in parallel according to their individual rates at locations along the reforming side of the membrane.

In the preferred embodiment, the feed flow of fuel and steam on the reformer side is in a direction opposite to the feed flow of air on the combustor side. (This arrangement is commonly referred to as counterflow.) Counterflow is preferred because it matches the cooling of the carbon dioxide to the pre-heating of the combustion air, and is also preferred because it matches the hottest portion of the combustion side with the reforming reaction, which is endothermic. Other arrangements such as co-flow or crossflow, both generally known in the art may be used, for example for mechanical or chemical reasons.

In a preferred embodiment, the catalyst for the water gas shift reaction is contiguous with or deposited on at least a portion of the surface of the heat exchange membrane. In this embodiment, steam reforming chemistry occurs first, illustrated as zone 71 in FIG. 1, and shift reactions occur second, illustrated as zone 72. In zone 71, steam-reforming reactions occur in the area 31 that is proximate to the membrane, and/or catalyzed by steam reforming catalyst 41. In zone 72, shift reactions occur in the area 32 that is proximate to the membrane, and/or catalyzed by shift catalyst 48. In this arrangement, heat 62 released by the shift reaction may be conducted to the combustion side 52 where it may provide preheat for the incoming air stream 8. Combustion of hydrogen in the region 51 of zone 71 provides heat 61 that is conducted to side 31 to provide the heat of the reforming reaction.

Hydrogen liberated or produced in the reforming reaction and the water gas shift reaction selectively permeates the membrane 4 to the combustion side 5 of the reactor. Selectively permeates, simply stated, means that the membrane porosity permits the diffusion of the relatively small size hydrogen molecules through the membrane, while blocking the flow of the other gases. Flux of hydrogen is from the reforming side 3 to the combustion side 5 and is illustrated in FIG. 1 with arrows 21 and 22.

It is preferred that, at areas of maximum hydrogen permeance, the hydrogen selectivity be at least 3:1 with respect to other gases such as nitrogen, oxygen, methane, CO, $CO_2$ and $H_2O$. In a preferred embodiment, the foregoing selectivity ratio is at least about 100:1. More preferred is a selectivity ratio of at least about 10000:1.

The remaining process stream 6 will substantially comprise carbon dioxide ($CO_2$). Having substantially isolated the $CO_2$ stream, this gas stream may be sequestered by such means as, adsorption or containment, injection into reservoirs such as deep wells, deep ocean injection, and the like. Therefore, in accordance with one aspect of the present invention, a process stream substantially comprised of $CO_2$ is isolated and available for sequestration by means known in the art.

As stated above, the hydrogen produced or liberated in the reforming reaction and water gas shift reaction permeates the heat exchange membrane 4 to the combustion side 5 of the reactor. The hydrogen is then combusted proximate to the heat exchange membrane 4. This is done to facilitate transfer of the heat of combustion of the hydrogen through the heat exchange membrane 4, to supply heat to the reforming reaction. In a preferred embodiment, at least a portion of the surface or surface region of the combustion side surface of the heat exchange membrane contains a catalyst for the combustion of hydrogen. This catalyst is most preferably on a portion of the surface or surface region of the membrane 4 that is juxtaposed the region where the stream reforming reaction occurs.

Catalysts that are suitable for use in the oxidation of hydrogen (i.e., combustion) of the invention include mixtures of metals and/or metal oxides from the transition elements as well as from groups 2a, 3a, and 4a of the periodic table (including Lanthanides and Actinides). Such catalysts may take on the conventional format of catalyst on support, however at the high temperature of operation utilized for the present invention, catalyst may take the form of a single mixed-metal oxide formulation, such as a substituted perovskite or hexaaluminate. Catalyst systems developed for catalytic combustion in gas turbines are particularly useful in the present invention (for example, see *Catalysis Today*, Volume 47, Nos. 1–2(1999)). Preferred support materials include oxides of elements in groups 2a, 3a 3b (including Lanthanides), 4a, and 4b. More preferred support materials include $Al_2O_3$, $TiO_2$, and $ZrO_2$, especially as stabilized, for example with rare-earth oxides. Also more preferred are hexaaluminate supports including $LaAl_{11}O_{18}$, (more generally $MAl_{11}O_{19-\alpha}$, where M is an element or mixture of elements, for example including La, Ba, Mn, Al or, Sr). Also more preferred are perovskite supports such as $LaCrO_3$ (more generally $M1M2O_{3-\alpha}$, where M1 and M2 are each an element or mixture of elements, for example including Fe, Ni, Co, Cr, Ag, Sr, Ba, Ti, Ce, La, Mn, Zr). Substituted hexaaluminate, perovskite, or mixed metal oxide supports may, in themselves, provide adequate catalytic activity for high temperature oxidation of hydrogen. Alternatively, a catalytic agent may be dispersed onto the support. Preferred catalyst materials include metals and oxides of elements in groups 6b, 7b, and 8. More preferred catalyst materials include metals and oxides of elements in groups 6*b*, 7*b*, and 8. More preferred catalyst materials are the group 8 metals and oxides, in particular metals and oxides of Fe, Rh, Pd, and Pt. Metals and oxides of Fe and Pd are most preferred for reasons of least volatility at high temperatures.

In addition to providing heat to the reforming reaction, the hydrogen combustion reaction produces energy. In one embodiment, this energy is utilized to power a turbine for the production of electricity. As illustrated in FIG. 1, compressed air 8 is fed to the combustion side of the reactor. The pressure of the compressed air may range from about three (3) bars to about three hundred (300) bars and preferably between about eight (8) bars and about fifty (50) bars. Because the combusted fuel is hydrogen, the combustion produces substantially no carbon dioxide product to be of concern regarding the greenhouse effect on the environment. Nor does effluent 9 contain substantial amounts of carbon monoxide or unburnt hydrocarbons of concern to the environment. In addition, the use of hydrogen as fuel provides wide process latitude regarding combustion stoichiometry and temperature. Combustion at relatively lean, cool (compared to stoichiometric combustion) conditions in proximity to the membrane will produce substantially no nitrogen oxide products. In this embodiment, the combustion energy powers a turbine for the production of electricity.

Figure 2:
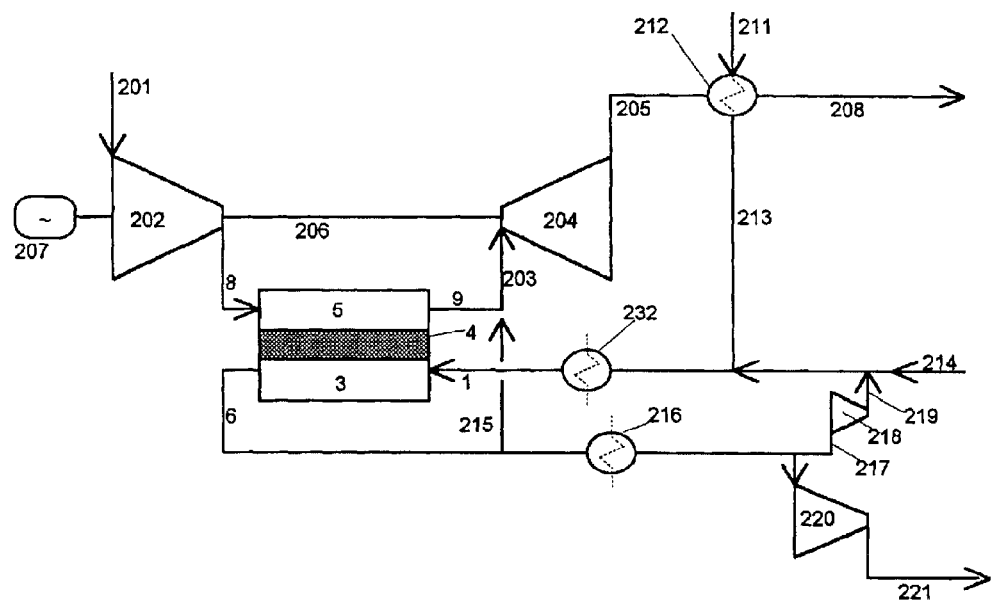
FIG. 2 is a diagram that illustrates the use of the heat exchange membrane reactor powering a gas turbine generator.

Referring now to FIG. 2, there is illustrated a heat exchange membrane reactor powered turbine for the production of electricity. The membrane reactor has a reformer side 3 and combustion side 5 separated by a heat exchange membrane 4. A hydrocarbon plus water (steam) feed 1 is supplied to the reformer side of the reactor. Hydrogen produced in the reforming reaction and the water gas thrift reaction permeates membrane 4 to the combustion side 3 of the reactor. Compressed air 8 is fed to the combustion side 3 of the reactor where hydrogen from the reformer reaction and water gas shift reaction has permeated to. The hydrogen is combusted; its combustion energy released into combustion product 9, which is directed to turbine expander 204. In some embodiments of the present invention, all or a fraction (215) of the reforming-side reaction product 6 is combined with combustion effluent 9 as a combined stream 203 that is directed to the turbine expander 204. Turbine expander 204 produces power on shaft 206, which power provides the compressive energy to compress air stream 201 via compressor 202, and which power is used to produce electricity in generator 207. The expanded combustor effluent 205 contains waste heat that can be recovered by raising steam and preheating feeds. In this embodiment, waste heat boiler 212 removes heat from the combustor effluent 205, and provides that heat to boiler feed water 211 to raise steam 213 that is fed to the reforming side of the reactor. Cooled combustor effluent 208 may be discharged to the atmosphere.

The reforming effluent 6 may be used in several ways. In a preferred embodiment, it is cooled in heat exchanger 216, increased in pressure via compressor 220, and finally sequestered as stream 221. Depending on steam/carbon ratios and other operating parameters, liquid water may need to be removed at some point in the cooling, compressing and sequestering of the reforming effluent. Such removal is well known in the art. In some embodiments, a portion 217 of the cooled reforming effluent is made into a higher-pressure stream 219 via compressor 218 and is recycled to the reformer feed. The combined reformer feed 1 consists of hydrocarbon feed 214, steam 213, and optionally recycled reformer effluent 219. The combined stream is preferably heated prior to introduction into the reactor, for example using heat exchanger 232. Heat exchanger 232 could be a furnace or could be heat recovery from effluent streams such as 6 or 205, some combination of furnace and heat recovery. Arranging such heat recovery is well known in the art.

A differential pressure ($\Delta P$) may exist between reforming side and the combustion side of the membrane. Differential pressure is characterized in two ways; the magnitude of the pressure difference and the sign of the pressure difference (which stream is higher pressure). Both of these characteristics may vary with application.

In some embodiments of the present invention, it will be preferred for the reformer to be at higher pressure than the combustor. For example, when the objective is to combust methane and leave a sequesterable $CO_2$ stream, it may be preferred to have the reforming side at substantially higher pressure than the combustion side. When the pressure of the reformer is higher than the combustor, the magnitude of that pressure difference is preferred to be less than about 100 bar.

In some embodiments of the present invention, it will be preferred for the combustor to be at higher pressure than the reformer. For example, when the objective is to use a low pressure fuel gas as turbine fuel without expending the cost of compressing that fuel gas, it may be preferred to have the reforming side at substantially lower pressure than the combustion side. In such an embodiment, a near-surface combustion of hydrogen on the combustor side creates a local low $H_2$ partial pressure, which enables transfer of the $H_2$ from the low-pressure reformer side to the high-pressure combustor side. When the pressure of the combustor is higher than the reformer, the magnitude of that pressure difference is preferred to be less than about 50 bar.

When the magnitude of the pressure difference is large (for either sign), then there may be debits associated with the required mechanical strength and the differences between volumetric flow rates between the two sides. For example, large pressure differences call for devices physically capable of supporting the forces associated with the high differential pressure. In some embodiments, the incentive of large differential pressure will justify the added complexity and cost of the configuration, in other applications it may not. Thus, for some embodiments, it is preferred that the differential pressure ($\Delta P$) between reforming side and the combustion side of the membrane be less than about 5 bars. For some embodiments it is preferred that the differential pressure ($\Delta P$) between reforming side and the combustion side of the membrane be less than about 20% of the higher of the two pressures.

The present invention may operate with feeds that may contain hydrocarbons, oxygenates, CO, $CO_2$, nitrogen, hydrogen, $H_2S$, sulfides, mercaptans, and thiophenes. Other trace components may also be present in the feed. The product from the reformer side will contain $CO_2$ and $H_2O$. A substantial portion of the $H_2O$ exiting the reformer originates as feed. The $CO_2$ in the gas exiting the reformer is the sum of the net amount produced in the reforming reaction and the amount originating with the feed. Other components that can be present are products that can be produced in the reforming reaction such as CO and hydrogen. The nitrogen level in the reformer product will be determined by the nitrogen level in the feed. The level of $H_2S$ in the product gas from the reformer will be determined by the amount of sulfur in the feed.

The ability to produce a stream that has a significant $CO_2$ concentration is one aspect of the invention. A significant $CO_2$ concentration can be produced when the feed contains less than about 35 mole % nitrogen and, in a preferred embodiment, less than 5 mole % nitrogen. When there is a substantial amount of $CO_2$ in the product gas, it may be economically disposed, stored, or utilized in underground formations. For example, product $CO_2$ may be utilized as an enhanced recovery fluid in oil reservoirs or may be sequestered in depleted oil or gas reservoirs. Certain aquifer formations are suitable for storing or sequestering $CO_2$. Because of the pressures in underground formations, in most cases the $CO_2$ has to be injected at high pressures. The cost of compression is substantially reduced when the stream exiting the reformer is substantially composed of $CO_2$. To minimize the cost of compression, it is advantageous to have the $CO_2$ rich stream exit the reformer at pressures above 100 psi and more preferable at pressures above 250 psi.

Another aspect of the invention is the potential to operate the membrane combustor in a mode that produces less $NO_x$. $NO_x$ production in combustion is generally associated with high temperatures. It is possible to operate the membrane combustor at temperatures lower than those normally required to sustain a flame. Lower temperature operation is possible because hydrogen is burned in the membrane combustor rather than a hydrocarbon Hydrogen can be combusted under conditions where hydrocarbons will not normally react The combustion of hydrogen may also be facilitated by a catalyst, allowing reaction at highly rich or lean conditions. When the membrane combustor is operated in a mode designed primarily for $NO_x$ reduction, it may be possible to combine the product streams exiting the reformer and combustion sides. Recombination of these streams may occur within the membrane module or after the streams exit the membrane module and before they are fed into a gas turbine.

By way of illustration, the following exemplify embodiments of the present invention.

EXAMPLE 1

Figure 3:
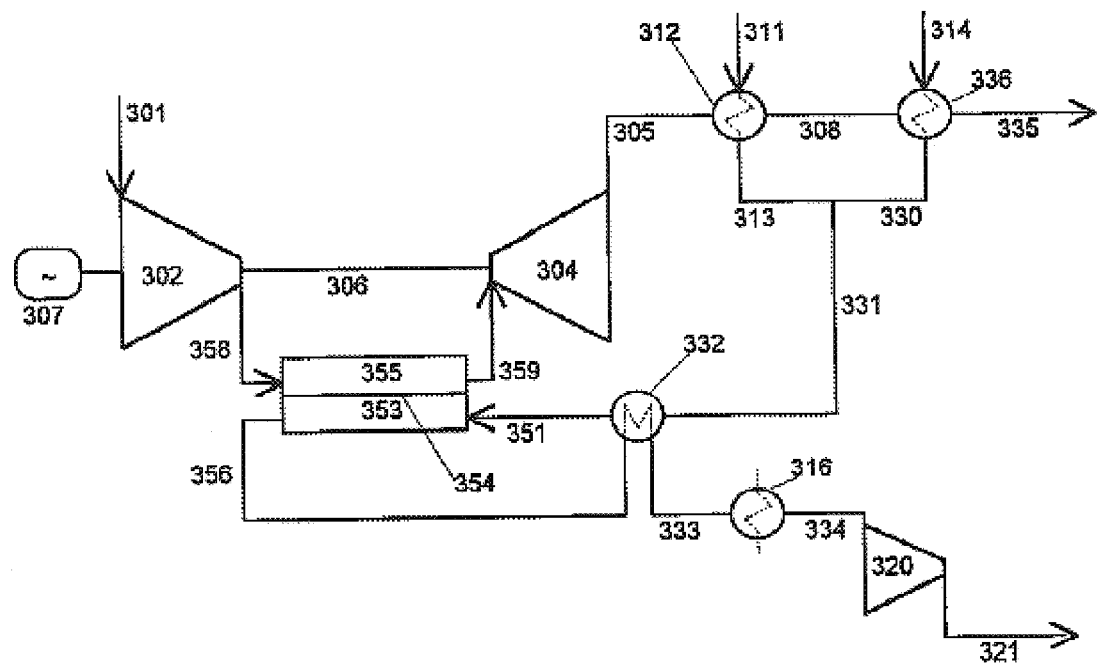
FIG. 3 is a diagram that illustrates the use of the heat exchange membrane reactor powering a gas turbine generation and sequestering $CO_2$.

In the present example, diagrammatically illustrated in FIG. 3, methane is combusted in heat exchanged membrane reactor, the reactor feeds and effluents being integrated with a gas turbine for power generation. The gas turbine is comprised of an air compressor 302, a power turbine 304, a shaft 306 and a generator set 307. Air 301 enters the compressor 302 and leaves as a pressurized stream 358 at a pressure of about 35 atmospheres absolute and a temperature of about 600° C. The air travels through the heat exchanged membrane reactor on the combustion side 355 where some of the oxygen reacts with hydrogen that has permeated the membrane 354. The combustion effluent 359 goes to the power turbine 304 where it is expanded to an atmospheric pressure stream 305 at a temperature of about 417° C. Component flow rates for streams 358 and 359 are shown in Table 1. Under these conditions the compressor 302 uses 100 MW of power and the turbine 304 yields 157 MW for a net gas turbine power yield 307 of 57 Megawatts.

The reforming side 353 of the heat exchanged membrane reactor is fed by a methane/steam stream 351 at a steam/methane mole ratio of 2.5 and preheated to 490° C. Within the reactor, the methane is completely converted to hydrogen and $CO_2$, the hydrogen permeating to the combustion side 355. The $CO_2$ and a residual amount of steam comprise the product stream 356 of the reforming side 353. Component flow rates for streams 351 and 356 are shown in Table 1. In the present example, 1.326 kg/sec of $H_2$ is created and permeated through the membrane 354.

TABLE 1

| FIG. 3 Identifier | Stream Flows, kg/sec | | | |
|---|---|---|---|---|
| | Reformer Feed 351 | Reformer Product 356 | Combustor Feed 358 | Combustor Product 359 |
| $O_2$ | 0.000 | 0.000 | 37.025 | 26.420 |
| $N_2$ | 0.000 | 0.000 | 121.875 | 121.875 |
| $CH_4$ | 2.651 | 0.000 | 0.000 | 0.000 |
| $H_2O$ | 7.457 | 1.491 | 0.000 | 11.931 |
| $CO_2$ | 0.000 | 7.291 | 0.000 | 0.000 |
| Total | 0.108 | 8.783 | 158.900 | 160.226 |
| Temperature, ° C. | 490 | 800 | 600 | 1224 |

The reformer feed 351 is preheated by recovering heat from several sources. The power turbine exhaust 305, at about 417° C. is used in a waste heat boiler 312 to make steam 313 from boiler feed water 311. The cooled exhaust 308, now at about 325° C. is then used in heat exchanger 336 to heat the methane fuel 314 from pipeline temperatures of about 25° C. to about 250° C., leaving the final flue-gas 335 at about 316° C. The heated methane 330 and the steam 313, both at about 250° C. are combined into a feed stream 331, which is heated in heat exchanger 332 against the reformer effluent stream 356. The resulting preheated reformer feed 351 is at about 490° C., while the cooled reformer effluent stream 333 is at about 300° C. This reformer effluent stream 333 is further cooled in air fin heat exchanger 316 to condense water and cool to about 50° C. Compressor 320 is used to raise this $CO_2$ stream to a high-pressure stream 321 suitable for sequestration.

In this example, the gas turbine net power 307 of 57 MW represents about 43% of the lower heating value of the methane feed 314. This compares favorably with the cycle efficiency of the gas turbine as used with a normal combustor. Because the cooled $CO_2$ effluent 334 is highly concentrated and at high pressure, the additional work required to compress to sequestration pressures is minimal. For example, compression to 160 bar would require less than a megawatt of power. Also, the flue gas 335 at about 317° C. would be suitable for generation of additional power via combined cycle operation.

EXAMPLE 2

Figure 4:
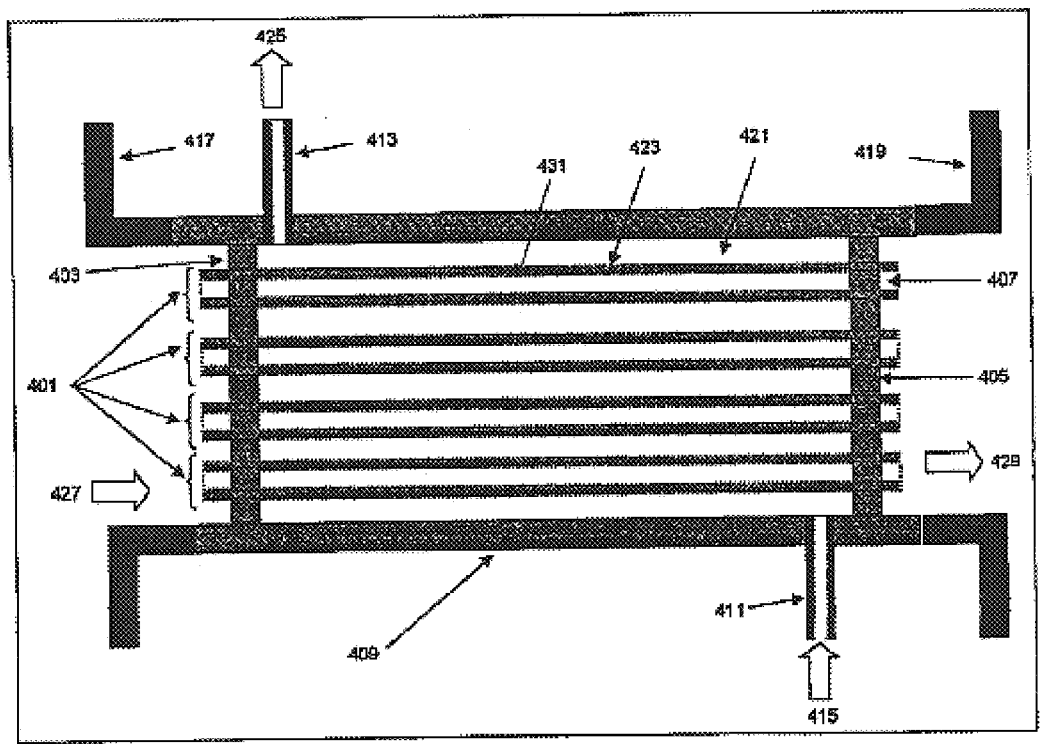
FIG. 4 is a cross sectional view of a modular embodiment of the heat exchange membrane reactor.

The membrane combustor module shown in FIG. 4 is formed from asymmetric tubular membranes 401. The tubular membranes are sealed into the module in a geometry similar to a tube in shell heat exchanger. Each tubular membrane is sealed at each end into a plate (403 and 405) in a manner such that gas can pass directly through the plate into the interior 407 of each tube. The plates (403 and 405) are in turn sealed into a ceramic tube 409 that forms the shell of the module. The ceramic tube 409 has fittings (411 and 413) that allow gas to be flowed inside the shell. At the ends of the module there are flanges (417 and 419) that allow the module to be sealed to inlet and exit pipes.

Compressed air 415 in the pressure range of 5 to 40 atmospheres is fed into the shell through fitting 411. The compressed air 415 entering the shell is in the temperature range from 25° to 1000° Centigrade. It is preferred that the compressed air be in the temperature range from 200 to 600° C. In general air will heat to these temperature ranges when it is compressed.

Within the shell space of the module 421, the oxygen in the compressed air reacts with hydrogen permeating the asymmetric tubular membranes 401, releasing heat and forming water vapor. It may be desirable to catalytically assist the reaction of oxygen and hydrogen. In this example the reaction is catalyzed with a platinum catalyst that is dispersed on the exterior surface 423 of the asymmetric membranes 401. The catalyst can be deposited from solution using standard dispersed metal catalyst preparation methods. When the catalyst is incorporated on the membrane surface 423, there is a tendency to have more of the exothermic water forming reactions occur on the membrane surface. This improves the thermal integration with the steam reforming and shift reactions that occur on the interior surface of the asymmetric membrane. Alternatively, other methods may be used to incorporate catalyst into the shell side 421 of the membrane. Catalyst can be incorporated into the shell space of the module 421 as pellets, monoliths or as a coating covering the entire interior shell surface.

Whether a catalyst is used or not it is preferable to have a substantial portion of the hydrogen permeating the membrane react with oxygen in the compressed air. As the compressed air travels down the length of the module from the inlet port 411 to the exit port 413, it heats up. The air and water vapor exiting the module 425 are preferably at a temperature in the range from 700 to 1400° C. This hot high-pressure air and water vapor stream 425 is fed to a gas turbine where electric power is produced.

In the interior of the tubular asymmetric membranes, a feed 427 containing $H_2O$ and methane is flowed in a direction that is countercurrent to the hot high pressure air and water vapor stream 425. The hydrocarbons and sulfur species in the feed 427 come from natural gas. The feed 427 also contains a portion of the reformed gas exiting 429 the tubular membranes. The reformed gas 429 is primarily composed of $CO_2$ and $H_2O$. A portion of this gas is recycled back to the input 427 to add $CO_2$ to the feed. The addition of $CO_2$ helps suppress carbon deposition within the tubular membrane. In particular, it helps control carbon deposition caused by the Boudart reaction. It is preferred that the amount of gas recycled back to the feed 427 be 0.1–50 volume % of the amount of natural gas fed. It is more preferred that the amount of gas recycled back to the feed be in the range of 2–20 volume %. The molar ratio of $H_2O$ to $CH_4$ in the feed, also known as the steam/methane ratio can range from 1 to 6. The steam/methane ratio is preferred to be greater than 2. When the steam/methane ratio is between 1 and 2, all of the carbon cannot be converted to $CO_2$ and a syngas product can be produced.

The feed 427 pressure of the gas mixture used to fuel the membrane combustor can be in the range from 1–200 atmospheres. It is preferred that the gas mixture be in the range from 2–50 atmospheres. The inlet temperature of the feed 427 can be in the range from 20–700° C. It is more preferred that the feed is a single-phase, gaseous stream at temperature above 250° C.

As the feed gas 427 travels countercurrently to the compressed air stream (415 and 425), it heats up. As the feed gas heats up it begins to react to form hydrogen. The initial reaction will be predominantly a steam reforming reaction that can be promoted by a catalyst. Further down the module, CO formed by the initial steam reforming reaction is converted to hydrogen and $CO_2$ with a water gas shift reaction. This reaction can be catalyzed with a catalyst that is different from the catalyst use to promote the reforming reaction. The catalyst for these reactions can be on the inner surface of the tubular membrane, within the wall of the tubular membrane of introduced as catalyst pellets within the interior 407 of the tubular membrane.

In this example, the membrane combustor module is formed from tubular membrane elements 401. The tubular membranes can have an inner diameter in the range from 0.1 to 25 millimeters and a wall thickness of 0.1–10 millimeters. It is preferred that the tube wall 431 be porous. The porous wall improves transport of hydrogen across the membrane and also provides structural strength. The most prevalent pore size is in the range from 0.01 to 100 $\mu$m. In this example the porous tube is made by sintering alpha alumina powder. A thin membrane that is permselective for hydrogen is formed near or on the inner or outer surface of the tube. In this example, the permselective hydrogen membrane is formed on the outer surface of the tube. The hydrogen selective membrane in this example is a 1 $\mu$m thick layer of dense alpha alumina. At the operating temperature of the membrane combustor module, the alpha alumina readily transports hydrogen.

EXAMPLE 3

This example follows the same flow diagram and conditions as Example 1, except that it has been adjusted for a feed that has a high level of $CO_2$. The feed in this case has a molar $CO_2/CH_4$ ratio of 2.65. The high level of $CO_2$ in the feed results in a higher heat capacity for the reformer effluent 356, which, in turn, means that the reformer feed 351 may be heated to a higher temperature. In this case, a reformer feed temperature of 610° C. is achieved, as shown in Table 2 below. The added $CO_2$ diluent results in additional small changes in the heat balance that result in the need for slightly higher methane feed rate, but also provide a slightly higher flow rate to the power turbine. The combination of these changes results in an efficiency decrease of about 0.4% relative to Example 1. Thus, power is extracted from a highly $CO_2$-diluted stream while maintaining the $CO_2$ at high concentration and pressure suitable for subsequent sequestration, and without substantial loss in efficiency.

TABLE 2

| | Stream Flows, kg/sec | | | |
|---|---|---|---|---|
| Component | Reformer Feed | Reformer Product | Combustor Feed | Combustor Product |
| $O_2$ | 0.000 | 0.000 | 37.025 | 26.304 |
| $N_2$ | 0.000 | 0.000 | 121.875 | 121.875 |
| $CH_4$ | 2.680 | 0.000 | 0.000 | 0.000 |
| $H_2O$ | 7.539 | 1.508 | 0.000 | 12.062 |
| $H_2$ | 0.000 | 0.000 | 0.000 | 0.000 |
| $CO_2$ | 19.562 | 26.933 | 0.000 | 0.000 |
| Total Stream | 29.781 | 28.441 | 158.900 | 160.240 |
| Temperature, ° C. | 610 | 800 | 600 | 1224 |

What is claimed is:

1. A hydrogen membrane reactor comprising:
    a reaction zone wherein a feed containing at least water and carbon-containing species undergoes a reforming reaction to produce hydrogen,
    a combustion zone wherein hydrogen produced in the reaction zone is combusted to produce heat and energy,
    a membrane separating said reaction zone and said combustion zone, said membrane functions to permit permeance of hydrogen and transmissions of heat through the membrane,
    where said reactor is configured to utilize at least a portion of the heat of the hydrogen combustion in the reforming reaction and at least a portion of the energy to produce electricity.

2. The reactor of claim 1 where the reforming reaction is a steam reforming reaction and said feed is steam and hydrocarbons.

3. The reactor of claim 2 where the reaction occurs proximate to the membrane.

4. The reactor of claim 3 where a catalyst is used to catalyze the steam reforming reaction, said catalyst being selected from the group comprising:
    a. noble metals and noble metal oxides
    b. transition metals and transition metal oxides
    c. group VIII metals
    d. Ag, Ce, Cu, La, Mo, Sn, Ti, Y, Zn, and combinations thereof.

5. The reactor of claim 4 wherein said catalyst is select from the group comprising Ni, NiO, Rh, Pt, and combinations thereof.

6. The reactor of claim 1 wherein said reforming reaction is conducted at a temperature ranging from about 400° to about 1400° C.

7. The reactor of claim 6 wherein said reforming reaction is conducted at a temperature ranging from about 700° C. to about 1300° C.

8. The reactor of claim 7 wherein said pressure ranges from about five (5) bars to about fifty (50) bars.

9. The reactor of claim 1 wherein said feed is provided at a pressure ranging from about one (1) bar to about three hundred (300) bars.

10. The reactor of claim 1 wherein said membrane has a hydrogen permeance ranging from about one (1) to about one million ($10^6$) moles/($m^2$-day-atm $H_2$).

11. The reactor of claim 1 wherein the pressure of the reaction zone is from about 0 to 100 bar higher than the pressure of the combustion zone.

12. The reactor of claim 11 wherein the pressure of the combustion zone is from about 0 to 50 bar higher than the pressure of the reaction zone.

13. The reactor of claim 1 wherein said membrane is fabricated from materials selected from the group comprising alumina, zirconia, silicon carbide, silicon nitride, MgO, $TiO_2$, $La_2O_3$, $SiO_2$, perovskite, hexaaluminate, high nickel content alloys, Hastelloys, cermets, and combinations thereof.

14. The reactor of claim 1 wherein said membrane reactor is comprised of one or more modules, each module having: (a) a reaction zone, a combustion zone, and a membrane separating said reaction and combustion zones, (b) a distribution and collection means for said reacting and combustion zones, (c) one or more membranes, (d) flow channels between said membrane elements, and (e) sealing means between combustion and reforming zones.

15. The reactor of claim 14 wherein catalyst is incorporated into said channels of the modules.

16. The reactor of claim 1 wherein said membrane is an asymmetric membrane, comprising a porous support having thickness of 0.1 to 10 millimeters and pores of 0.05 to 30 microns, and on one side a selective diffusion layer having thickness of about 100 angstroms to 500 microns.

17. The reactor of claim 16 wherein said asymmetric membrane is a catalytic membrane wherein a catalyst is incorporated on either membrane surface or within or on pore structures of the membrane.

18. The reactor of claim 1 wherein a catalyst is used to catalyze the combustion of hydrogen, where said catalyst is selected from the group comprising:

a. hexaaluminates, perovskites, and mixed metal oxides, b. metals and metal oxides of elements in groups 6b, 7b, and 8, c. Metals and oxides of Fe, Rh, Pd, and Pt, or combinations thereof.

19. The reactor of claim 1 where the effluent of the reaction zone is a concentrated carbon dioxide stream that is cooled, compressed, and injected into a reservoir for sequestration of carbon.

20. The reactor of claim 19 where said concentrated carbon dioxide stream is injected into geological formations to facilitate sequestration of carbon.

21. The reactor of claim 19 where said concentrated carbon dioxide is injected into deep water to facilitate sequestration of carbon.

* * * * *